United States Patent [19]
Greaves

[11] Patent Number: 5,978,876
[45] Date of Patent: *Nov. 2, 1999

[54] SYSTEM AND METHOD FOR CONTROLLING COMMUNICATIONS BETWEEN SUBSYSTEMS

[75] Inventor: Paul E. Greaves, Granite Bay, Calif.

[73] Assignee: Play, Inc., Rancho Cordova, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/834,242

[22] Filed: Apr. 14, 1997

[51] Int. Cl.⁶ .................................................. G06F 13/14
[52] U.S. Cl. .............................. 710/107; 710/41; 370/431
[58] Field of Search ..................................... 395/311, 312, 395/287, 853, 854, 858, 861; 370/346, 433, 449, 431; 710/131, 132, 107, 33, 34, 41; 709/225

[56] References Cited

U.S. PATENT DOCUMENTS

| | | | |
|---|---|---|---|
| 5,260,944 | 11/1993 | Tomabechi | 370/347 |
| 5,463,629 | 10/1995 | Ko | 370/463 |
| 5,553,071 | 9/1996 | Aranguren et al. | 370/433 |
| 5,563,883 | 10/1996 | Cheng | 370/449 |
| 5,748,925 | 5/1998 | Waclawsky et al. | 395/311 |
| 5,781,623 | 7/1998 | Khakzar | 379/230 |

Primary Examiner—Gopal C. Ray
Attorney, Agent, or Firm—Carr & Ferrell LLP

[57] ABSTRACT

A communication control system provides dynamic centralized control of subsystem communications. In a preferred embodiment, a dedicated subsystem communications coordinator is coupled to a main control bus which is utilized for subsystem communication. The coordinator is further coupled to each subsystem for enabling subsystem communication. The coordinator preferably assigns each pending communication a time-based transfer-window channel designation which, while asserted on the control lines of the main control bus, signals corresponding enabled subsystems to transfer data. The coordinator further preferably monitors all subsystem communications for limiting message length and for continuously determining the most effective main control bus utilization according to current system-wide communications needs.

20 Claims, 5 Drawing Sheets

SYSTEM AND METHOD FOR CONTROLLING COMMUNICATIONS BETWEEN SUBSYSTEMS

BACKGROUND OF THE INVENTION

1. Field of the Invention

This invention relates to subsystems communications and more particularly to a subsystem communication control system.

2. Discussion of the Prior Art

Many computers and other electronic systems handle complex processes by dividing a given process into subprocesses and using different elements of the system ("subsystems") simultaneously to execute respective subprocesses. To coordinate this type of distributed processing, the subsystems are typically interconnected by a communications "bus" or busses, and are provided with interface circuits for enabling communications of commands and data. Thus, in a distributed processing system, one subsystem performs its task and communicates the result to another subsystem, and so on, until the entire process has been completed.

Subsystem interconnections may have any of several configurations ("topologies") including one or more serial and/or parallel busses and multiple bus subdivisions ("subbusses"). Address and data bus-lines can be separate ("non-multiplexed") or shared ("multiplexed"). The term "bus" herein refers to a linear bus topology, which is a parallel, multiplexed or non-multiplexed bus of continuous lines which are designated for certain kinds of connections to subsystems. An example of such a bus is the typical personal computer ("PC") configuration illustrated by FIG. 1. PC bus 101 interconnects processor 120, memory 130, host video I/O controller 140, host audio I/O controller 150, user-I/O controller 160 (for connecting user interface control devices such as a keyboard and/or mouse) and system expansion interface 170. A secondary bus 143 connects video I/O controller 140 to monitor 145, and another secondary bus 103 connects system expansion interface 170 to other subsystems (not shown).

Overall communication-flow ("bus traffic") is typically controlled by designated bus-master subsystems capable of initiating communications to each other and to slave subsystems capable only of responding to communications.

Conventional master subsystems control communications among subsystems on a communication-by-communication basis. A bus having only one communications pathway allows only one communication at a time and therefore, before attempting to communicate over a one-path bus, a master must wait until the bus is not being used. Then, since at any time more than one master might attempt a communication, the requesting master must acquire exclusive control of the bus. When the bus becomes available, the master typically begins arbitration by communicating a message over the bus requesting control of the bus. If no other master is communicating a similar request, then the requesting master may initiate communication. Conflicting contemporaneous requests can be resolved using typically a combination of predetermined prioritization and first-come-first-served criteria to allocate the bus to a prevailing master. Thus, arbitration times are often unpredictable and, with many contemporaneously requesting masters, can be long.

A master, having acquired control of a bus, typically initiates a transfer by issuing a command which includes the address of a slave that is to send or receive data. If the slave is available, then it begins sending or receiving. Otherwise, the master generally waits for the slave to become available. Alternatively, if another capable slave exists, the master may attempt to utilize it. Typically, however, the master must yield control of the bus and then request control anew. If meanwhile other masters have begun requesting control of the bus, then all the masters must conduct an arbitration. Once communication is initiated with a slave, there are few limitations on the length of time utilized for the communication, and meanwhile any other subsystems requesting communications must wait. Communication itself is typically conducted by a master by addressing a slave and transferring data on a word-by-word basis in order to clearly identify the intended data recipient.

Conventional subsystem-directed communications, as described thus far, are well matched to the needs of conventional personal computers ("PCs") and other less complex systems. The Personal Computer Interface ("PCI") bus of a conventional PC, for example, supports essentially predictable communication. Typically, since each of the three or four subsystems supported performs a unique function in an essentially repetitious manner, a subsystem sends data resulting from a given type of processing to the same next-subsystem. For example, a PC-based sound-processing subsystem repeatedly sends processed sound-data to the same audio-controller for output. Thus, subsystem communication control by masters according to predetermined and fixed priorities is sufficient. PCs also do not typically require or provide for the highly robust responses of real-time systems. Thus, the potentially substantial delays associated with waiting for an available bus, seeking control of the bus, arbitration and waiting for an uninterruptable slave have been acceptable, as have delays associated with word-based transfer controls typically directed by the master.

Unfortunately, delays inherent to master-slave systems may be unacceptable in systems requiring more robust responses, such as real-time systems. To make matters worse, communication patterns are far less predictable in more complex systems, and designation of masters and predetermined priority-criteria become less effective in coordination of subsystems as the number and complexity of the subsystems increase. As the number of subsystems increases, the possibility that an equal or higher-priority master might monopolize a bus increases and the possibility of time-consuming arbitration also increases. Other delays inherent to master-slave systems are also likely to be magnified as system complexity increases. Additionally, master subsystems are typically highly complex and use expensive components.

Thus, there is a need for a dynamic, robust, flexible and well-coordinated means for directing subsystem communications.

SUMMARY OF THE INVENTION

The present invention provides a dynamic, robust, flexible and well-coordinated means for directing subsystem communications. The invention comprises a centralized subsystem communication controller that allocates communication resources and conducts subsystem communications according to dynamic system needs.

In a preferred embodiment, a system communication controller ("coordinator") is coupled via a main control bus and other connections to each subsystem, and is also connected to a host PC for user control and monitoring. The coordinator assigns time-sharing communications "channels" to selected subsystem pairs and then, utilizing the main control bus and dedicated control connections, dynamically and interruptably enables assigned communication channels. In further accordance with the preferred embodiment, a dynamic memory access ("DMA") type communication is utilized. Preferably, the coordinator monitors communications and limits message-lengths,in a manner leaving an integral coordinator processor free for other tasks.

Advantageously, the use of a dedicated and centralized subsystem communications controller maximizes responsiveness to system requirements while minimizing system cost. The centralized coordinator is better equipped than individual non-dedicated subsystem masters to dynamically apportion available communication resources according to ongoing user control, known system parameters and ongoing communications monitoring.

Further advantage is gained through avoidance of unnecessary delays. The combined use of a channel assignment, dedicated control lines, independently monitored DMA transfers and dynamic decision making by the coordinator each provides more immediate, interruptable and switchable access to the bus.

These and other advantages and benefits of the present invention will become apparent from the drawings and specification that follow.

DETAILED DESCRIPTION OF THE PREFERRED EMBODIMENT

Figure 1:
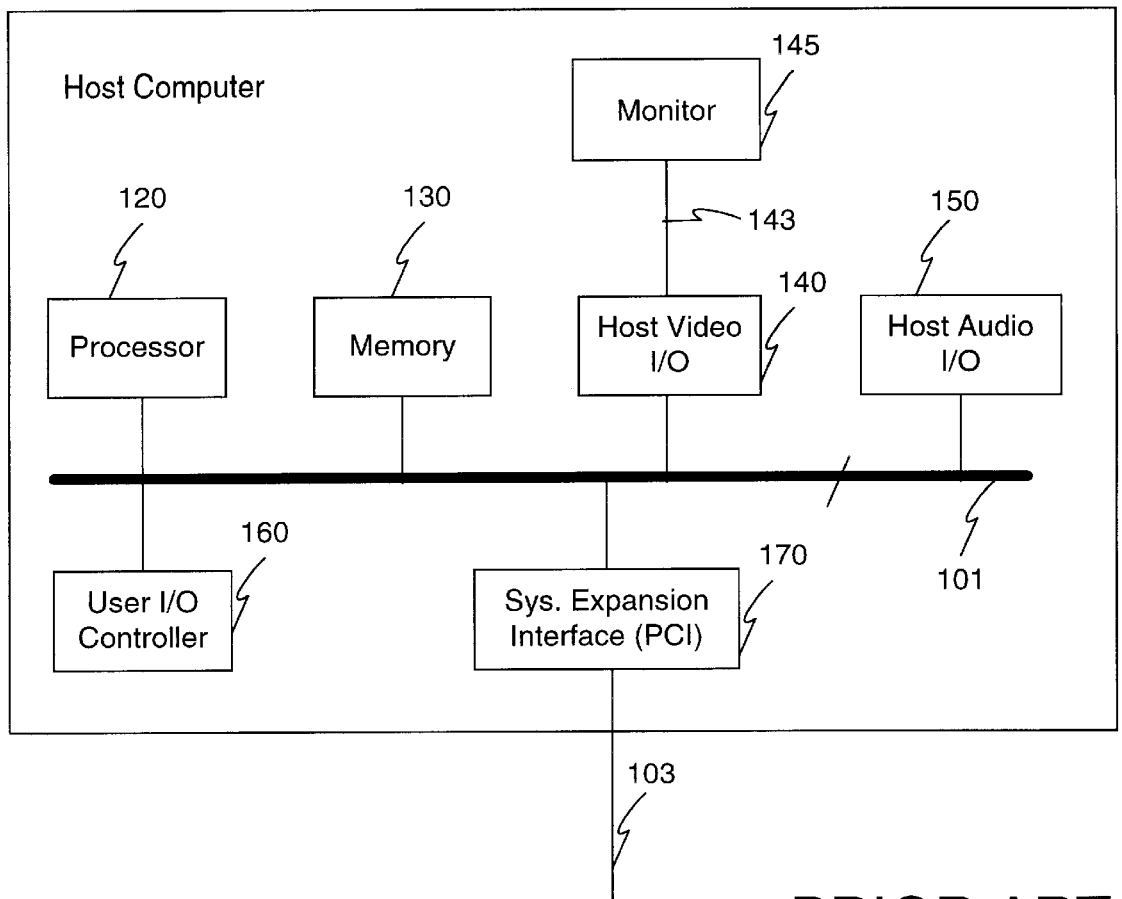
FIG. 1 is block diagram showing the functional elements of a conventional host personal computer.
Figure 2:
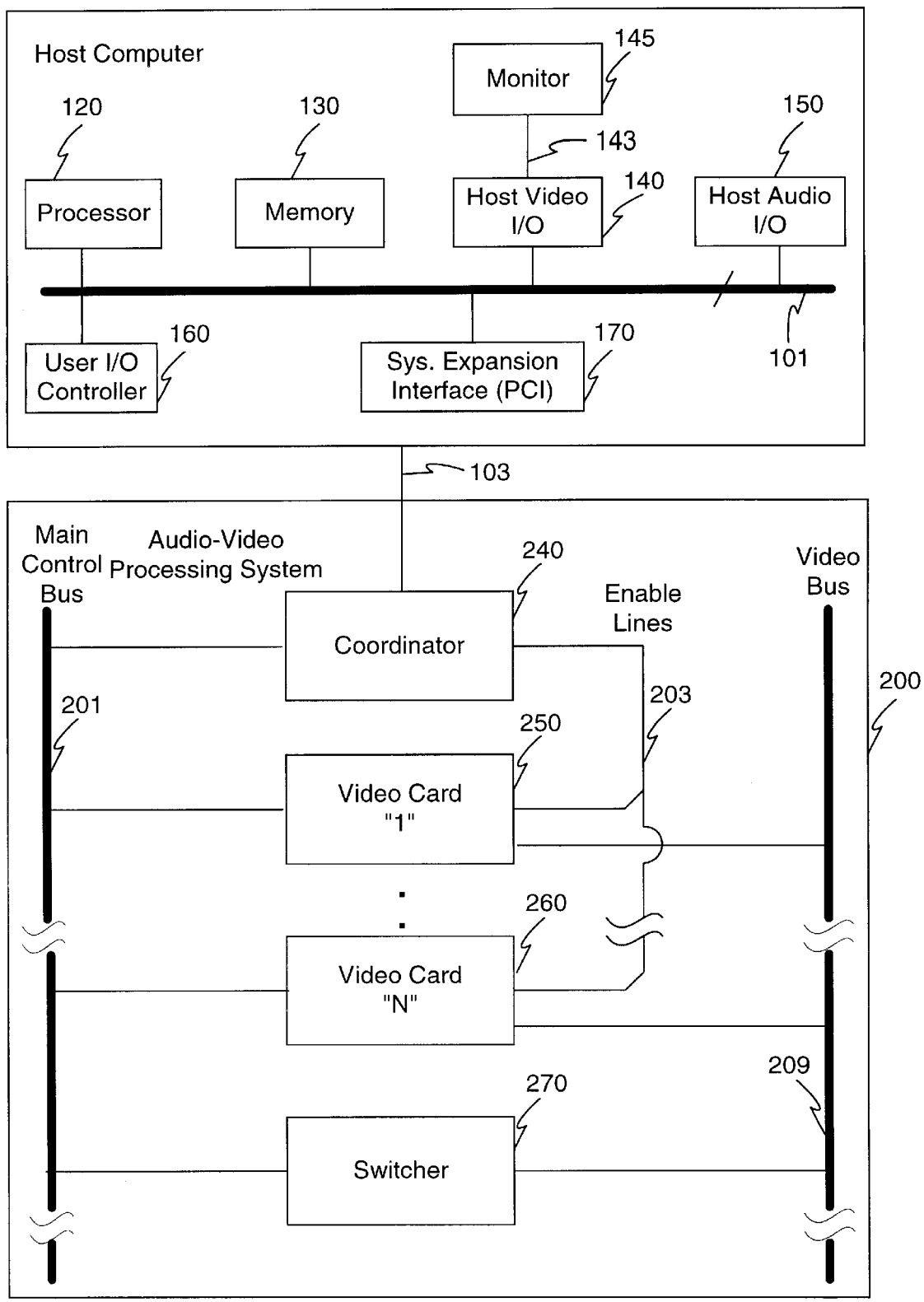
FIG. 2 is a functional block diagram showing subsystems and interconnections of a video system in accordance with the invention, including its connection to the host personal computer of FIG. 1.

FIG. 2 shows how subsystem communication requirements are met according to the present invention in an independently operable audio-video processing system ("video system") 200 having a peripheral connection 103 to host PC 100.

Video system 200 is a modular, re-configurable and expandable system of elements needed for real-time mixing and/or processing of one or more audio and/or video data input streams. Video data streams supplied by external video sources are, for example, input through respective I/O control subsystems (not shown), then preprocessed (not shown) to provide a consistent internally-utilized format and then communicated over video bus 209 for individual and/or combined-stream ("mixed") processing. Actual processing varies from adding titles and splicing video segments to animation, video effects and virtual-world type enhancement. Video system 200 also provides sophisticated audio and time-locked audio-video processing.

Video system 200 comprises subsystems including coordinator 240, video processing subsystems "video card-1" 250 through "video card-N" 260, switcher 270, and interconnections including main control bus 201, communications "enable"lines 203 and video bus 209. Video card-1 250 through video card-N 260 manipulate the video data. Additionally, a peripheral communication link 103 to system expansion interface 170 of PC 100 provides use of PC-based resources for user control, downloading and audio-video previewing.

Operation of video system 200 is centrally monitored and controlled by coordinator 240 according to user audio-video manipulation selections and other input received through connection 103 from host PC 100 system expansion interface 170. Coordinator 240 provides for subsystem address assignment, bus utilization and other subsystem communications and control functions that utilize main control bus 201. Coordinator 240 also controls operation of switcher 270, which in turn directs audio and video data flow over video bus 209.

Video system 200 real-time performance and overall flexibility at a minimized cost are achieved in several ways. For example, many subsystems, including the video cards (e.g., video card-1 250, video card-N 260), are socketed such that subsystems can easily be added or replaced. Another example is that many video cards and other subsystems provide programmable audio-video processing functionality. Thus, maximized functionality is provided by continuously maximized utilization of available subsystems. A further example is that while the number of bus-lines is limited to minimize cost, use of available bus throughput is maximized through efficient and dynamically assignable bus utilization by coordinator 240.

Subsystem addresses allow directing communications to and from specific subsystems. While video card-1 250 to video card-N 260 each receive all communications over shared main control bus 201, the video cards decode only communications including their address.

Figure 3:
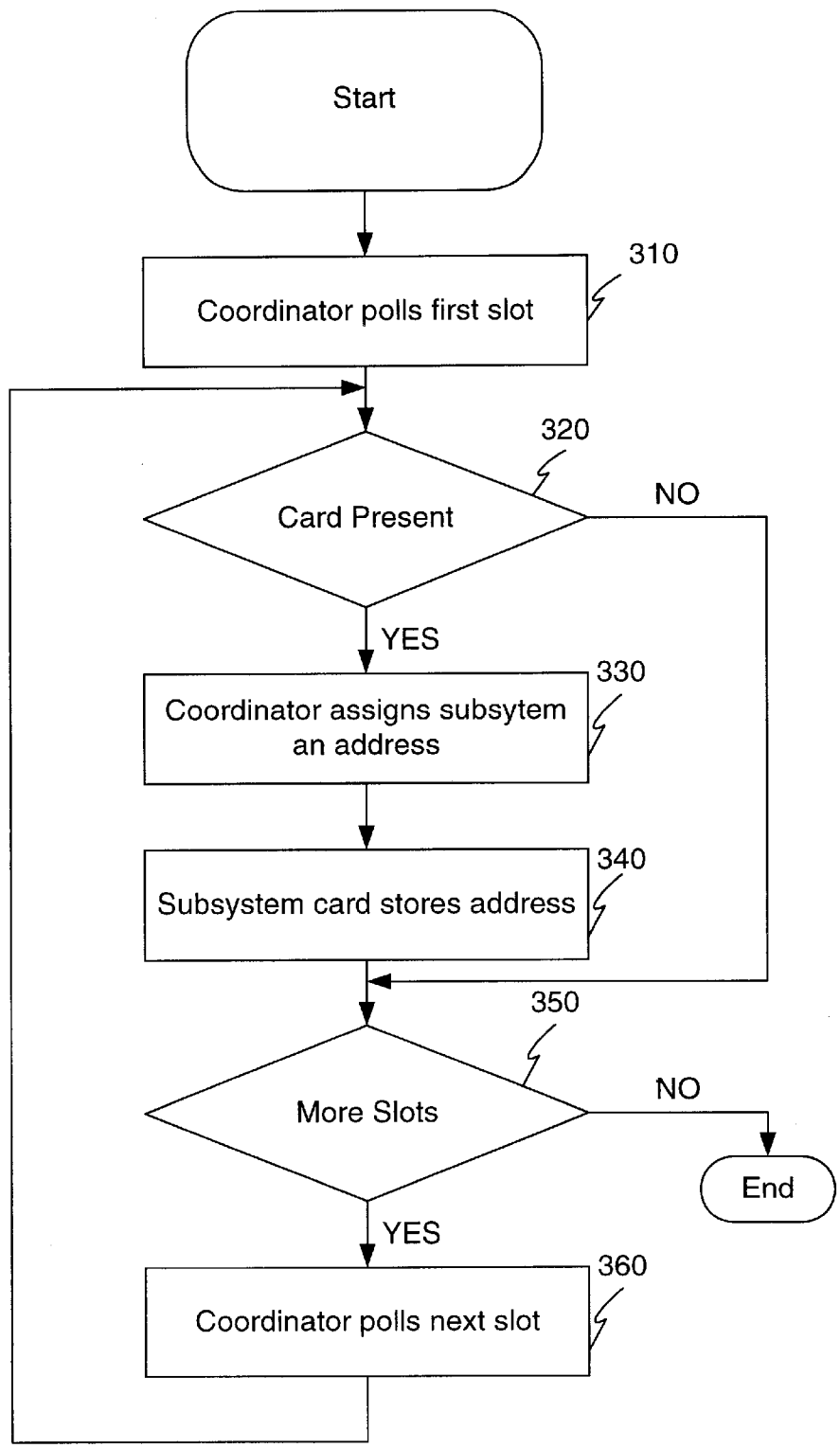
FIG. 3 is a flowchart of method steps for providing subsystem addresses in accordance with the invention.

The FIG. 3 flowchart, with reference to FIG. 2, illustrates how during system reset a unique address is statically assigned to each subsystem. In step 310, coordinator 240 polls a first card slot for the presence of a subsystem card. If in step 320 a card is found in the first slot, then in step 330 coordinator 240 transfers a first available address over bus 201 to the subsystem card and, in step 340, the subsystem card stores the address in its memory (e.g. 257b or 267b, FIG. 4). If instead, in step 320, a subsystem card is not found in the first slot, then no address is assigned. Whether or not there is a subsystem card in the first slot, in step 350 if video system 200 has more slots that have not been polled, then in step 360 coordinator 240 polls a next slot and returns to step 320. If instead, in step 350, no more slots remain to be polled, then all subsystem cards present have been assigned unique addresses and address assignment is complete.

Subsystem addresses are thus assigned in a sequential manner for all subsystems found during initialization. Contrary to conventional bus-mastering however, subsystem addresses are not utilized throughout subsystem communication as a means for allocating main control bus 201. As will be discussed further with reference to FIGS. 4 and 5, coordinator 240 utilizes subsystem addresses for alerting respective subsystems as to an assigned communication channel, thereby rapidly reassigning bus channels.

Figure 4:
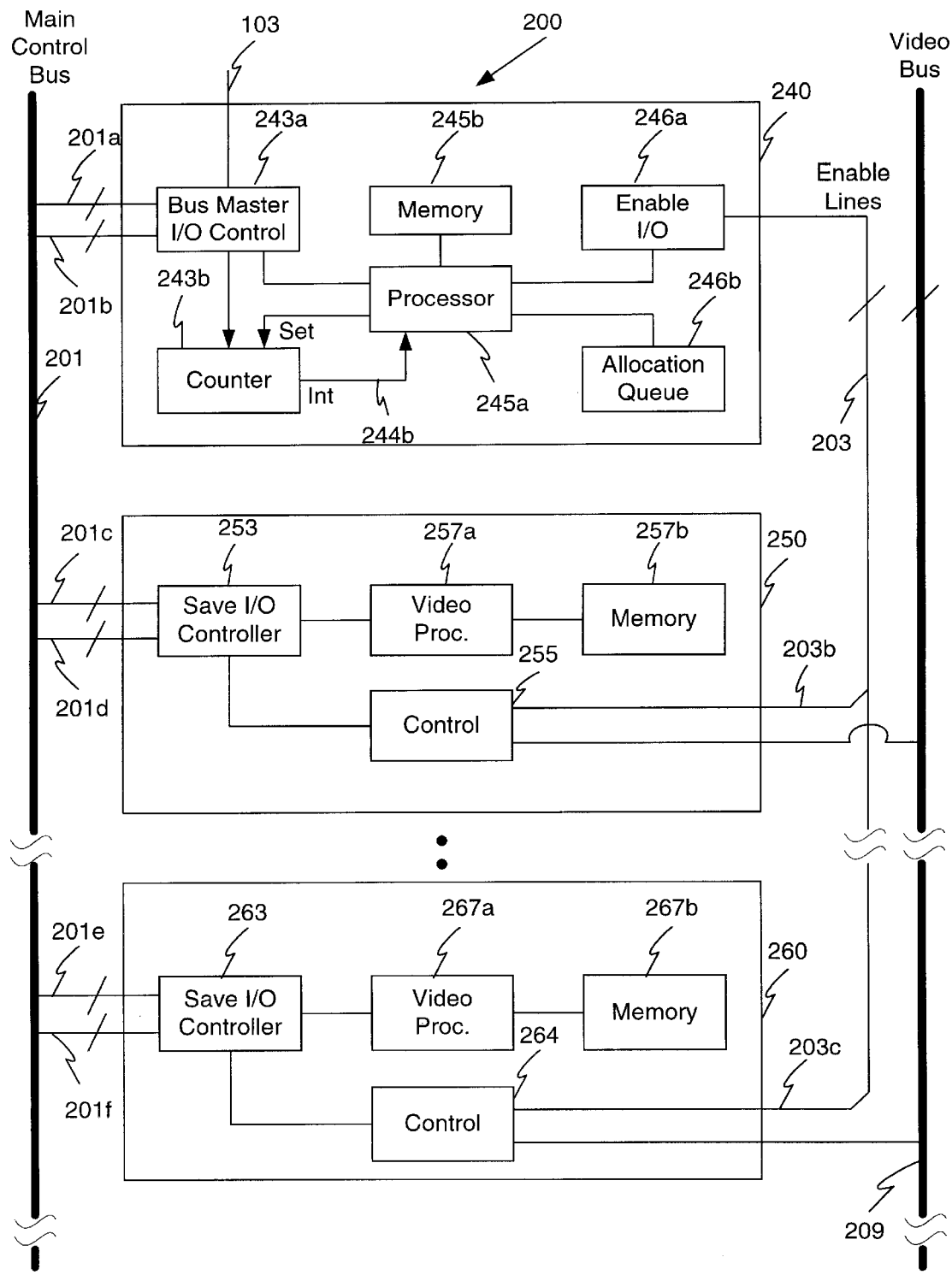
FIG. 4 is a detailed block diagram showing subsystem communication control functions and interconnections in accordance with the invention.

FIG. 4 is a detailed view of FIG. 2 showing components used by video system 200 to coordinate and control communications. Coordinator 240 comprises ongoing communication control elements including bus master I/O controller 243a and message length counter 243b, processing elements including processor 245a and processor-memory 245b, and bus allocation elements including enable I/O controller 246a and allocation queue 246b. Coordinator 240 is connected by connection 201a to main control bus 201 control lines, connection 201b to main control bus 201 address and data lines, and connection 203 to subsystem communications enable lines 203b and 203c.

Video card-1 250 comprises communication elements including slave I/O controller 253 and subsystem controller 255, as well as video processing elements including video processor 257a and memory 257b. Video card-I 250 is connected by connection 201c to main control bus 201 control lines, connection 201d to main control bus 201 address and data lines, and connection 203b to enable lines 203. Similarly, video card-N 260 comprises communication elements including slave I/O controller 263 and subsystem controller 264, as well as video processing elements including video processor 267a and memory 267b. Video card-N is also connected by connection 201e to main control bus 201 control lines, connection 201f to main control bus 201 address and data lines, and connection 203b to enable lines 203.

Coordinator 240 preferably contains no video processing components. Rather, it is responsible for all monitoring and control of subsystem communications, and is therefore the only subsystem requiring expensive bus mastering components. Conversely, video cards 250 through 260 are dedicated primarily to processing of received video data and therefore only require less expensive communication components.

Subsystem communication is coordinated by coordinator 240 based upon user control information received over connection 103 from PC 200 (FIG. 3), system activity monitored over main control bus 201 and known system characteristics, records of which are stored in processor memory 245b. Since coordinator 240 controls all communication over main control bus 201, coordinator 240 remains informed of each dataset and its processing from the time the data is input. Coordinator 240 also controls system 200 configuration and therefore has related configuration information available as well. Processor 245a evaluates such information to continuously determine the most appropriate communication and then dynamically initiate and control such communication. All communications are handled similarly except for a priority given to interactive user instructions.

Processor 245a generates, as a result of communication-need evaluation, a time-based transfer-window ("communications channel") designation. The designation preferably includes subsystem addresses for a subsystem that will send a dataset and for a subsystem that will receive the dataset, as well as the number of a channel according to which data will be sent. A channel number is a re-assignable code that coordinator 240 stores in allocation queue 246b and then, along with respective send and receive instructions, communicates over main control bus 201 address and data lines to the currently assigned subsystems. Coordinator 240 later (during an allocated transfer period) asserts a "channel on" message and a selected channel number through connection 201a onto main bus 201 control lines to instruct sets of assigned subsystems to begin or continue transferring data.

Since coordinator 240 can change the control code on main control bus 201 control lines to re-allocate main control bus 201 almost instantly, the use of channel assignments provides for robust dynamic bus assignments.

Coordinator 240 additionally provides subsystem enabling control for each subsystem such that channels can be re-assigned without the need to first clear a prior assignment. Prior to initiating assigned subsystem communication, processor 245a, preferably uses enable I/O controller 246a to assert selected enable lines 203. Subsystem controller 255 of video card-1, for example, is enabled through connection 203b to one of enable lines 203 while video card-N is enabled through connection 203c to a different one of enable lines 203. Thus, coordinator 240 independently enables each of the assigned subsystems to drive main control bus 201.

One advantage made possible by such dual (channel and subsystem-enable) control is that, by continuously disabling one enable line pair while enabling another, a single channel can be used to switch among multiple-subsystem pair communications. Thus a minimum number of main control bus 201 control lines can be used to greater effect.

During subsystem communication, bus master I/O controller 243a and counter 243b offload lower-level monitoring and control from processor 245a to enhance system performance. Processor 245a initiates communication by setting counter 243b and sending to bus master I/O controller 243a a command code to "turn on" an included channel number. Bus master I/O controller 243a asserts main control bus 201 control connections 201a to latch the command codes on main control bus 201. Bus master I/O controller 243a, through main control bus 201 address and data bus connections 201b, monitors bus activity and decrements counter 243b for each data word received by a subsystem. Counter 243b, upon being decremented to zero, asserts an interrupt signal on connection 244b to processor 245a. The counter 243b set valve thus defines, unless superseded by processor 245, a data transfer block size limit for each communication block. While the counter 243b set value is variable depending upon particular system performance constraints, a counter-set value indicating a block size of sixty four is preferably used for video system 200.

Subsystem communication is otherwise conducted by the communicating subsystems utilizing slave I/O controllers 253 and 263 according to a DMA protocol. An enabled subsystem, having received on main control bus 201 address and data lines a control code designating it a sending subsystem on, for example, channel-1, and having received a channel-1 control code on main control bus 201 control lines, will send a next data word and then wait for an acknowledge signal. Similarly, an enabled subsystem, having received a control code on main control bus 201 address and data lines designating it as a receiving subsystem on a given channel, and having received the given channel control code on main control bus 201 control lines, will expect a data word.

The specific embodiment of bus master I/O controller 243a and of slave I/O controllers 253 and 263 may be varied according to cost, response time and other criteria. Each slave I/O controller is, however, preferably configured to receive from coordinator 240 and respond appropriately to commands including subsystem address designations, channel designations and the presence or absence of appropriate channel-on codes. Two main control bus 201 control lines are used for indicating one of up to four channels, and two more are used for command codes. In addition, slave I/O controllers 253 and 263 preferably acknowledge received data words, in response to which coordinator 240 bus master I/O controller 243a decrements counter 243b.

Figure 5:
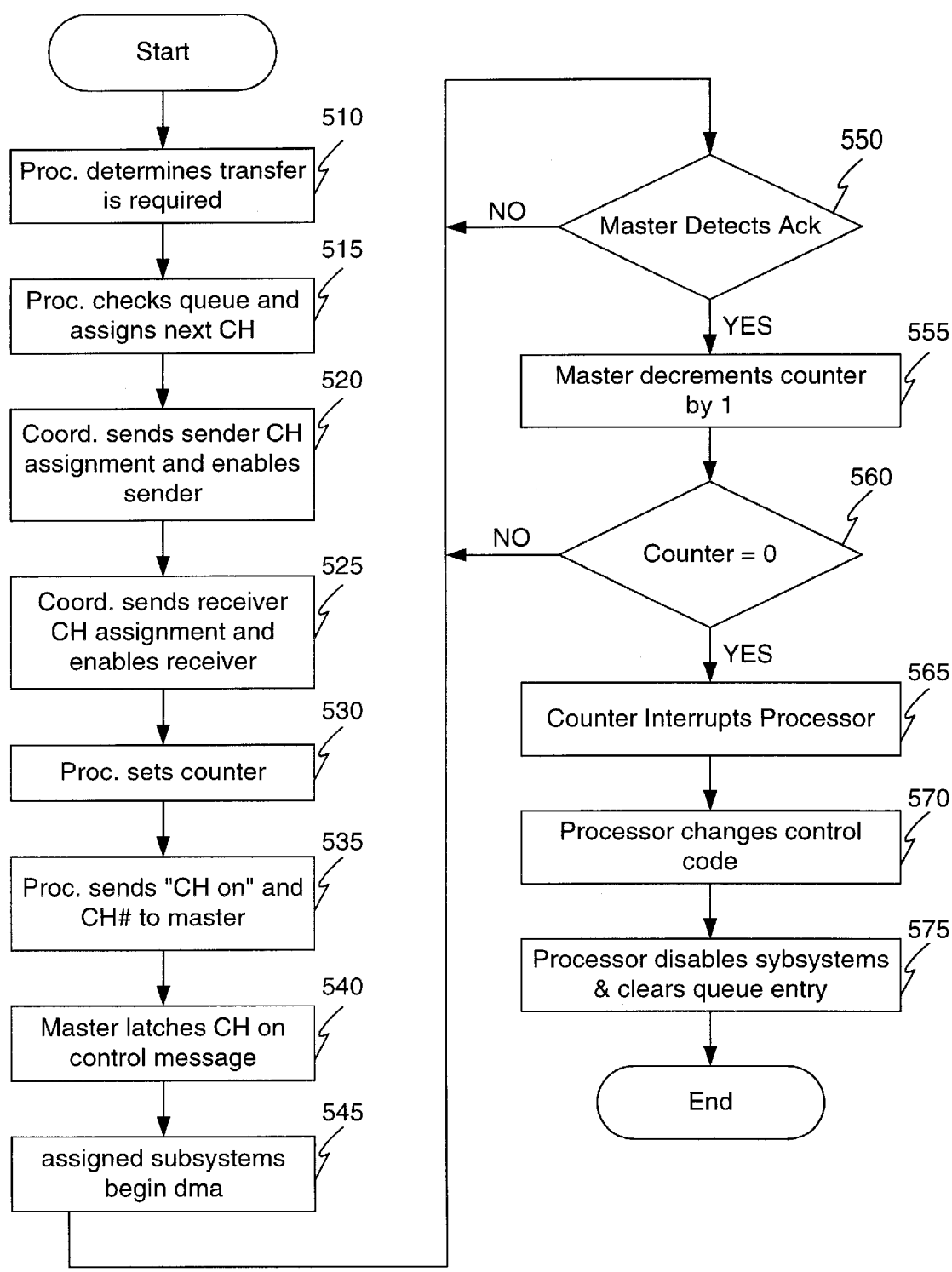
FIG. 5 is a flowchart of method steps for dynamic communication channel assignment and monitoring of subsystem communication according to the invention.

The FIG. 5 flowchart illustrates how coordinator 240 (FIG. 2) allocates main control bus 201 for subsystem communications. This illustration assumes that no other transfers are pending and that a sender subsystem is sending a complete dataset. Since processor 245a has determined that a subsystem communication ("transfer") is required 510, a transfer is initiated in steps 515 through step 540, the transfer occurs in steps 545 through 560 and post-transfer steps occur in steps 565 through 575.

In step 515, processor 245a polls allocation queue 246b to determine the next available communications channel number. In step 520, coordinator 240 sends the communications channel designation including the allocated channel number and notification that the subsystem will send data, to a first subsystem ("sender"), and then coordinator 240 enables the sender. In step 525, coordinator 240 sends the communications channel designation including the allocated channel number and notification that the second subsystem will receive data, to a second subsystem ("receiver"), and then enables the receiver. In step 530 processor 246a sets counter 243b. In step 535, processor 246a sends a "channel-on" message including the allocated channel number to bus master I/O controller 243a. In step 540, controller 243a latches the received channel-on message on main control bus 201 control lines, and in step 545 the sender and receiver begin the transfer.

If bus master I/O controller 243a in step 550 detects an acknowledge, then in step 555 it decrements counter 243b by one. If, in step 560, counter 243b has not been decremented to zero, then there remains data to be transferred and the process repeats steps 550 through 560. However, if in step 560 counter 243b has been decremented to zero, then in step 565 counter 243b interrupts processor 245a. Processor 245a in step 570 changes the control code and in step 575 disables the sender and receiver and clears the allocated request from allocation queue 246b.

Since none of the conventional master-slave bus acquisition and arbitration delays are present and coordinator 240 is freed from video processing and lower-level control to continually analyze system-wide communication needs, initiation of a new transfer is robust. The relative priority of a communication is in most cases continually known by coordinator 240 and even a new channel assignment incurs little delay. In addition, once established, a channel can be re-activated quickly by re-enabling designated subsystems and/or issuing a channel-on message indicating that channel.

The use of robust channel assignment, channel pausing, channel switching and other capabilities of the invention also provides flexibility in typical cases of more than one concurrent request for subsystem communication. This is particularly the case where subsystem communications control is dynamically provided by a dedicated centralized controller such as coordinator 240.

Communication on any assigned channel continues only while a corresponding channel-on code is present on main control bus 201 address and data lines and while the communicating subsystems are enabled. Thus, an ongoing communication can be paused while, for example, coordinator 240 transfers configuration data to another subsystem. A pause might also be appropriate while another channel is utilized for a higher priority transfer, a transfer upon which further tasks depend, or simply a short message that in a conventional master-slave system might wait inordinately long. Pausing a transfer might also be appropriate where one or more communicating subsystems fails to operate properly, so that the channel could be altered for receipt by an alternative subsystem. Controlled broadcasting is also possible by setting multiple receiving subsystems to the same channel. Numerous other examples exist. In addition, pausing and other capabilities are provided dynamically.

Thus, less than complete data sets might be utilized, among other available dynamic selection and/or manipulation. Centralization further removes complexity attributable to coordination of, for example, multiple masters.

Another example of such flexibility is the use of channel switching for dynamically interleaving subsystem communications. Since switching from one communications channel to another is almost instantaneous, repeated switching will result in communication according to each channel appearing to occur almost continuously. Dynamic control by processor 245a not only provides for interleaving, but also provides for interleaving initiation and discontinuance, unequal time ("weighted") interleaving and variably weighted interleaving either singly or in a mixed fashion. In addition to an equivalent need to move larger amounts of data among various subsystems, such capability might also be utilized for seemingly simultaneous bi-directional ("full duplex") communication or other functionality.

While the above description contains many specifics, these should not be construed as limitations on the scope of the invention but rather as examples of preferred embodiments thereof. Many other possibilities exist within the spirit and scope of this invention. For example, while video system 200 is useful for illustrative purposes, dynamic centralized subsystem communications control according to the present invention is also applicable to a variety of other systems in which efficient utilization of available communication resources is desired.

A second example is that the invention is also applicable to systems employing topologies other than the linear bus model illustrated, as well as systems in which multiple topologies are utilized and/or where no specific topology model predominates. Similarly, the number and types of communications connections may vary substantially from those of the illustrated video system. This includes, for example, the use of multiple busses and/or sub-busses for communication as well as varied error reporting and resolution. Control according to the invention is, for example, especially well suited to more complex systems including any number of subsystems and/or communications interconnections.

A third example is that a broad range of coordinator 240 configurations, control messaging and command sets might be used. Processor 245a need not employ a particular decision making model and it is likely that some decision making characteristics might be shared with another processor, bus master I/O controller 243a or other components, particularly but not necessarily where control methods are repeated. Such functionality might be distributed and/or utilize specific processor 245a commands. Various channel control structures other than a queue might be utilized. Discrete channel assignment means, while not preferred, might also be utilized. In addition, numerous control codes or messages other than channel-on might be utilized.

What is claimed is:

1. A system for coordinating and controlling communications over a plurality of communication connections between a plurality of subsystems, comprising:
   a host computer;
   a video processing system coupled to the host computer for receiving control information from the host computer, the processing system comprising:
   a plurality of subsystems connected in parallel with a communications controller by a control bus so that pairs of the subsystems can directly communicate with each other over the control bus; and the communications controller allocating available communication connections according to ongoing determinations of system communications needs by dynamically assigning communications channels to pairs of the subsystems and controlling communications between the subsystems according to the ongoing determinations.

2. A system for coordinating and controlling communications over a plurality of subsystems, comprising:

a plurality of subsystems for sending and receiving communications; and a communications controlling coordinator coupled to each of the subsystems for controlling said communications between said subsystems;

the communications controlling coordinator including a processor for determining a need for communication between a pair of the subsystems, assigning a channel for the communication, transmitting information regarding the asssigned channel to the pair of subsystems, and instructing the pair of subsystems to commence communication on the assigned channel.

3. The system for coordinating and controlling communications of claim 2, wherein each of said plurality of subsystems is a video card.

4. The system for coordination and controlling communications of claim 2, wherein said subsystems are capable of being added or replaced.

5. The system for coordinating and controlling communications of claim 2, further comprising:

a system expansion interface permitting input selections from a host computer.

6. The system for coordinating and controlling communications of claim 2, wherein said coordinator comprises:

ongoing communications control elements including a bus master I/O controller, a message length counter, a first processor and a first processor memory; and bus allocation elements including an enable I/O controller and an allocation queue.

7. The system for coordinating and controlling communications of claim 2, wherein:

the processor initiates communication by setting a counter and sending a command code to turn on the assigned communication channel to a bus master I/O controller.

8. The system for coordinating and controlling communications of claim 2, wherein:

the coordinator stores a number associated with the assigned channel in an allocation queue.

9. The system for coordinating and controlling communications of claim 2, wherein each of said subsystems further is a comprises:

a slave I/O controller, a subsystem controller, a video processor, and a second memory.

10. The system for coordinating and controlling communications of claim 2, wherein said communication are conducted according to a dynamic memory access protocol.

11. The system for coordinating and controlling communication of claim 2, wherein:

said coordinating monitors and controls said communications over a main bus.

12. The system for coordinating and controlling communications of claim 2, wherein:

said coordinator monitors said communications, evaluates the most appropriate communication channel, and dynamically implements the most appropriate communications channel.

13. The system for coordinating and controlling communications of claim 2, wherein one of said subsystems is a sender and another of said subsystems is a receiver.

14. The system for coordinating and controlling communications of claim 2, wherein said pair of subsystems exchange said communications in a full duplex mode.

15. A method of dynamically controlling communications between a plurality of subsystems, comprising:

providing a plurality of subsystems;

assigning an address to each subsystem;

determining a need for communications between a pair of the subsystems;

assigning one of a plurality of communications channels to conduct the communication between the pair of subsystems;

transmitting a communications channel designation to the pair of subsystems to alert the subsystems of the assigned communications channel; and exchanging said communications between said subsystems over the assigned communications channel.

16. The method of dynamically controlling communications of claim 15, further comprising:

dynamically and interruptably reassigning a new communications channel between the pair of subsystems.

17. The method of dynamically controlling communications of claim 15, further comprising:

monitoring bus activity and decrementing a counter value as the communication is sent.

18. The method of dynamically controlling communications of claim 15, further comprising:

pausing said exchanging of communications for new communications.

19. The method of dynamically controlling communications of claim 18, wherein:

said pausing occurs for higher priority transfers, transfers upon which further tasks depend, relatively short messages, transfers of less than complete data sets, or in response to improper operation of the subsystem.

20. A system for dynamically controlling communications, comprising:

a plurality of subsystem means for sending and receiving said communications, each communication having a length;

means for initializing addresses for each of said subsystem means;

means for determining a need for communications between a pair of the subsystems;

means for assigning one of a plurality of communications channels to conduct the communication between the pair of subsystems;

means for transmitting a communications channel designation to the pair of subsystems to alert the subsystems of the assigned communications channel;

means for counting the length of said communications; and means for dynamically and interruptably maintaining said channel directly between said subsystems.

* * * * *